US012783137B2

(12) United States Patent
Kim et al.

(10) Patent No.: US 12,783,137 B2
(45) Date of Patent: Nov. 3, 2026

(54) STORAGE DEVICE EXPANDING THE SIZE OF USER DATA AREA AND METHOD FOR OPERATING THE SAME

(71) Applicant: SK hynix Inc., Icheon-si (KR)

(72) Inventors: Yong Ho Kim, Icheon-si (KR); Seok Jeong Han, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/893,434

(22) Filed: Sep. 23, 2024

(65) Prior Publication Data

US 2025/0251869 A1 Aug. 7, 2025

(30) Foreign Application Priority Data

Feb. 2, 2024 (KR) ........................ 10-2024-0016306

(51) Int. Cl.
*G06F 3/06* (2006.01)

(52) U.S. Cl.
CPC ............ *G06F 3/0631* (2013.01); *G06F 3/061* (2013.01); *G06F 3/0659* (2013.01); *G06F 3/0673* (2013.01)

(58) Field of Classification Search
CPC ...... G06F 3/0631; G06F 3/061; G06F 3/0659; G06F 3/0673; G06F 3/0652; G06F 3/0679
See application file for complete search history.

(56) References Cited

U.S. PATENT DOCUMENTS

| | | | | |
|---|---|---|---|---|
| 10,176,190 | B2 * | 1/2019 | Harijono | G06F 16/1815 |
| 11,438,416 | B1 * | 9/2022 | Kang | G06F 3/0653 |
| 11,675,699 | B2 * | 6/2023 | Lee | G06F 12/0253 711/154 |
| 2019/0339885 | A1 * | 11/2019 | Yanagihara | G06N 3/045 |
| 2022/0300185 | A1 * | 9/2022 | Amaki | G06F 3/0652 |

FOREIGN PATENT DOCUMENTS

| | | | |
|---|---|---|---|
| KR | 10-2018-0012061 | A | 2/2018 |
| KR | 10-2018-0102483 | A | 9/2018 |
| KR | 10-2022-0103340 | A | 7/2022 |

* cited by examiner

*Primary Examiner* — Masud K Khan

(57) ABSTRACT

A storage device may allocate at least one of a plurality of memory blocks to a user data area that stores user data, allocate at least one of the remaining memory blocks, among the plurality of memory blocks, that are not allocated to the user data area to a reserved area, receive a command requesting to increase the size of the user data area by a target size from a host, and reallocate, in response to the command, one or more of the memory blocks allocated to the reserved area to the user data area.

15 Claims, 13 Drawing Sheets

STORAGE DEVICE EXPANDING THE SIZE OF USER DATA AREA AND METHOD FOR OPERATING THE SAME

CROSS-REFERENCES TO RELATED APPLICATION

The present application claims priority under 35 U.S.C. § 119(a) to Korean patent application number 10-2024-0016306 filed in the Korean Intellectual Property Office on Feb. 2, 2024, which is incorporated herein by reference in its entirety.

BACKGROUND

1. Technical Field

Various embodiments of the present disclosure generally relate to a storage device that expands the size of the user data area and a method for operating the storage device.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

Generally, the size of the user data area used to store user data in the storage device is fixed. However, in order for a host using the storage device to store additional user data, the storage device needs to provide an increased user data area to the host.

SUMMARY

Various embodiments of the present disclosure are directed to provide a storage device capable of providing additional space for a host to store user data and allowing efficient garbage collection to be performed while the size of the user data area is increased, and a method of operating the same.

In one aspect, a storage device may include a memory including a plurality of memory blocks; and a controller configured to allocate at least one of the plurality of memory blocks to a user data area that stores user data, allocate at least one of the remaining memory blocks, among the plurality of memory blocks, that are not allocated to the user data area to a reserved area, receive a command from a host requesting an increase in the size of the user data area by a target size, and reallocate to the user data area, in response to the command, one or more of the memory blocks allocated to the reserved area.

In another aspect, an operating method of a storage device may include receiving a command from a host requesting an increase to the size of a user data area, which is included in a plurality of memory blocks, by a target size; and reallocating, in response to the command, one or more of the memory blocks allocated to a reserved area to the user data area.

According to embodiments of the present disclosure, it is possible to provide space for a host to store additional user data and allow efficient garbage collection to be performed while the size of the user data area is increased.

DETAIL DESCRIPTION

Figure 1:
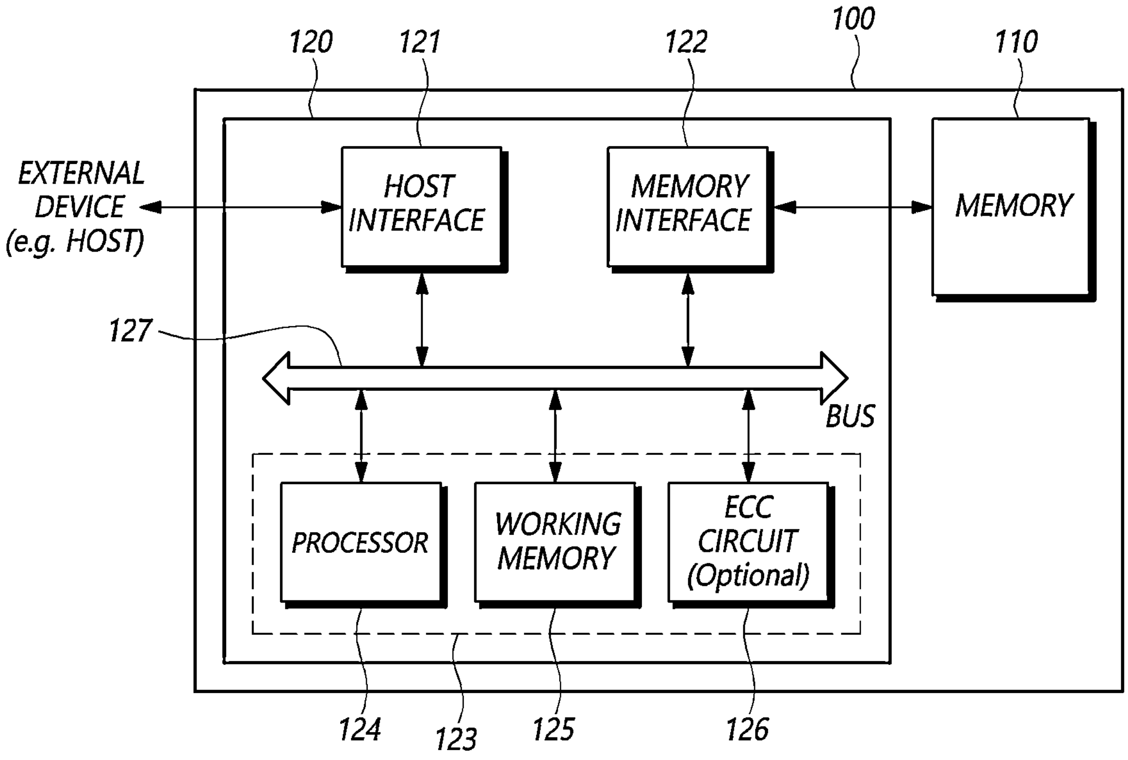
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 to be capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer, which performs a translating function between a logical address requested to the storage device 100 from the host and a physical address of the memory 110; a host interface layer (HIL), which serves to analyze a command requested to the storage device 100 as a storage device from the host and transfer the command to the flash translation layer; and a flash interface layer (FIL), which transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g. SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector that is uncorrectable in read data last. There may be one or more sectors that are determined to be uncorrectable. The error detection and correction circuit 126 may transfer information (e.g., address information) regarding a sector that is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
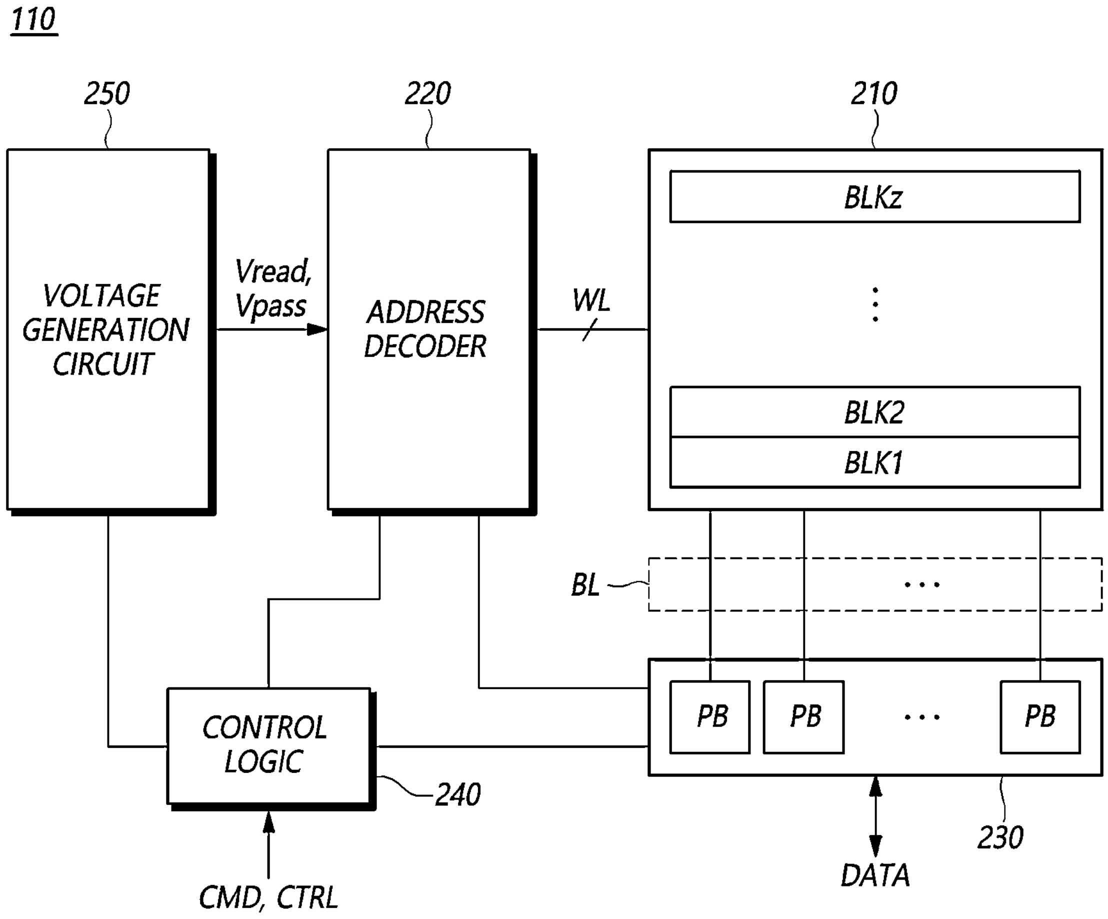
FIG. 2 is a block diagram schematically illustrating a memory of FIG. 1.

FIG. 2 is a block diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
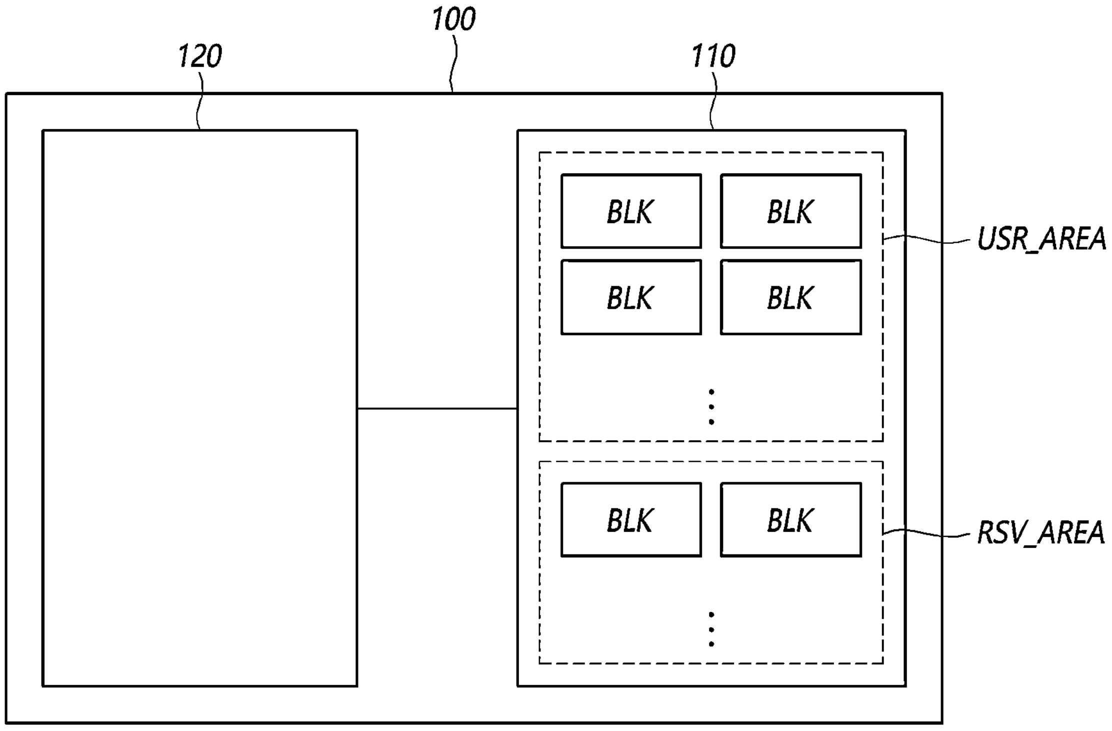
FIG. 3 is a diagram showing a schematic structure of a storage device according to an embodiment of the present disclosure.

FIG. 3 is a diagram showing a schematic structure of a storage device according to an embodiment of the present disclosure.

Referring to FIG. 3, storage device 100 may include a memory 110 and a controller 120.

The memory 110 may include a plurality of memory blocks BLK.

The controller 120 may allocate at least one of the plurality of memory blocks BLK to a user data area USR_AREA. The user data area USR_AREA is an area that stores user data. The user data area USR_AREA may also be referred to as a user area, user density area, etc.

A host (not shown) located outside the storage device 100 may store user data in the user data area USR_AREA and read the user data stored in the user data area USR_AREA.

The controller 120 may allocate at least one of the remaining memory blocks, from among the plurality of memory blocks BLK that are not allocated to the user data area USR_AREA, to a reserved area RSV_AREA. For example, the reserved area RSV_AREA may be an area used for a background operation.

The controller 120 may set the size of the user data area USR_AREA to a predetermined reference size. For example, the reference size may be set to a certain percentage (e.g., 93.1%) of the total storage capacity of the memory 110.

The controller 120 may dynamically change the size of the user data area USR_AREA as needed. For example, the controller 120 may reallocate one or more of the memory blocks allocated to the reserved area RSV_AREA to the user data area USR_AREA to increase the size of the user data area USR_AREA. In this case, the size of the reserved area RSV_AREA decreases and the size of the user data area USR_AREA increases, which will be described in detail with reference to FIG. 4 below.

Figure 4:
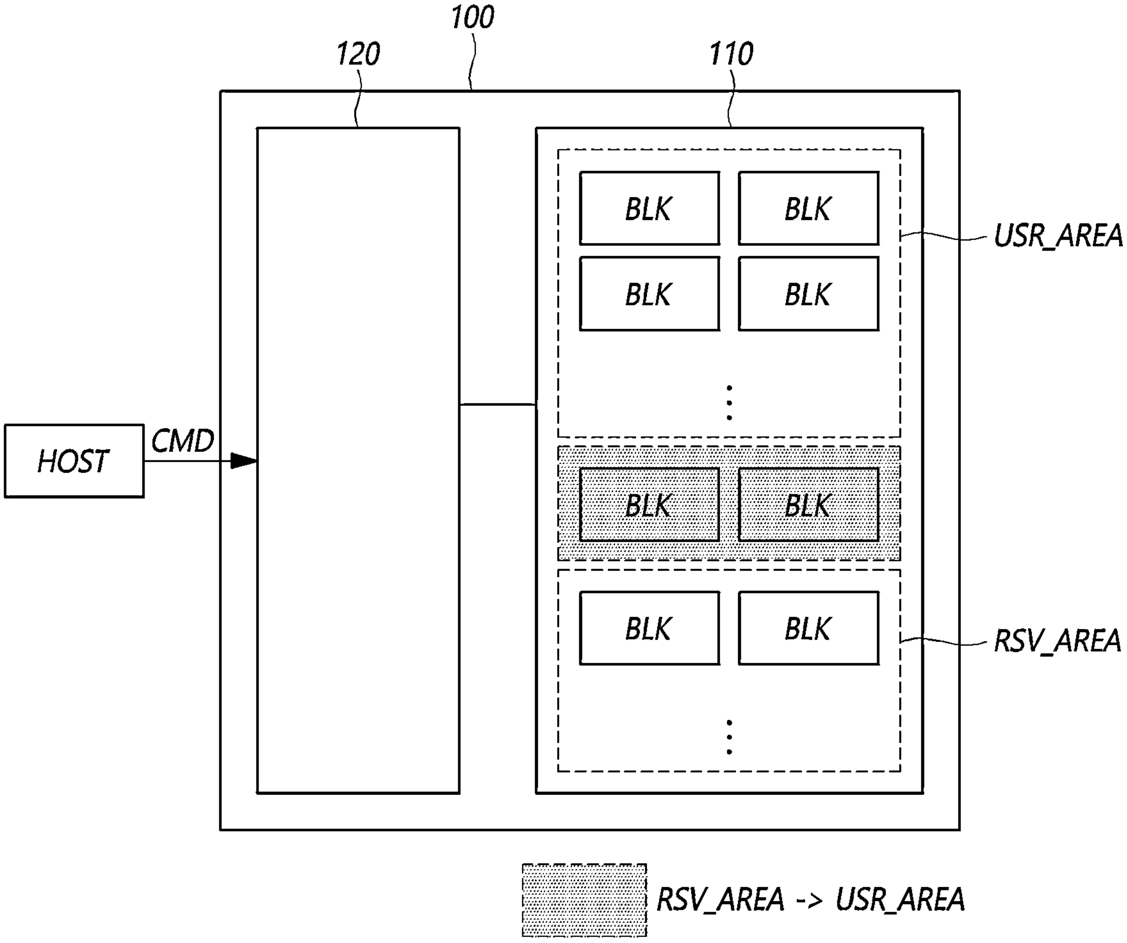
FIG. 4 is a diagram showing an operation in which a storage device increases the size of a user data area according to an embodiment of the present disclosure.

FIG. 4 is a diagram showing an operation in which a storage device increases the size of a user data area according to an embodiment of the present disclosure.

Referring to FIG. 4, a controller 120 of a storage device 100 may receive a command CMD from a host HOST requesting an increase in the size of the user data area USR_AREA by a target size. For example, the command CMD may request that the size of the user data area USR_AREA be increased, from the predetermined reference size, by a target size.

In order to store additional user data in the storage device 100, the host HOST may transmit the command CMD to the storage device 100 requesting to increase in the size of the user data area USR_AREA.

In response to the command CMD received from the host HOST, the controller 120 may reallocate one or more of the memory blocks allocated to the reserved area RSV_AREA to the user data area USR_AREA.

As described above, the size of the reserved area RSV_AREA decreases and the size of the user data area USR_AREA increases. As a result, the storage device 100 may provide the host HOST with additional space to store user data. A user data area USR_AREA expanded by the request of the host HOST may be referred to as an ultra space (USP).

Before transmitting the above-described command CMD, the host HOST may receive information about the maximum size of the user data area USR_AREA from the storage device 100 and determine the size of an increase to the user data area USR_AREA based on the maximum size. That is, the controller 120 of the storage device 100 may transmit information about the maximum size of the user data area USR_AREA to the host HOST, which will be described in detail with reference to FIG. 5.

Figure 5:
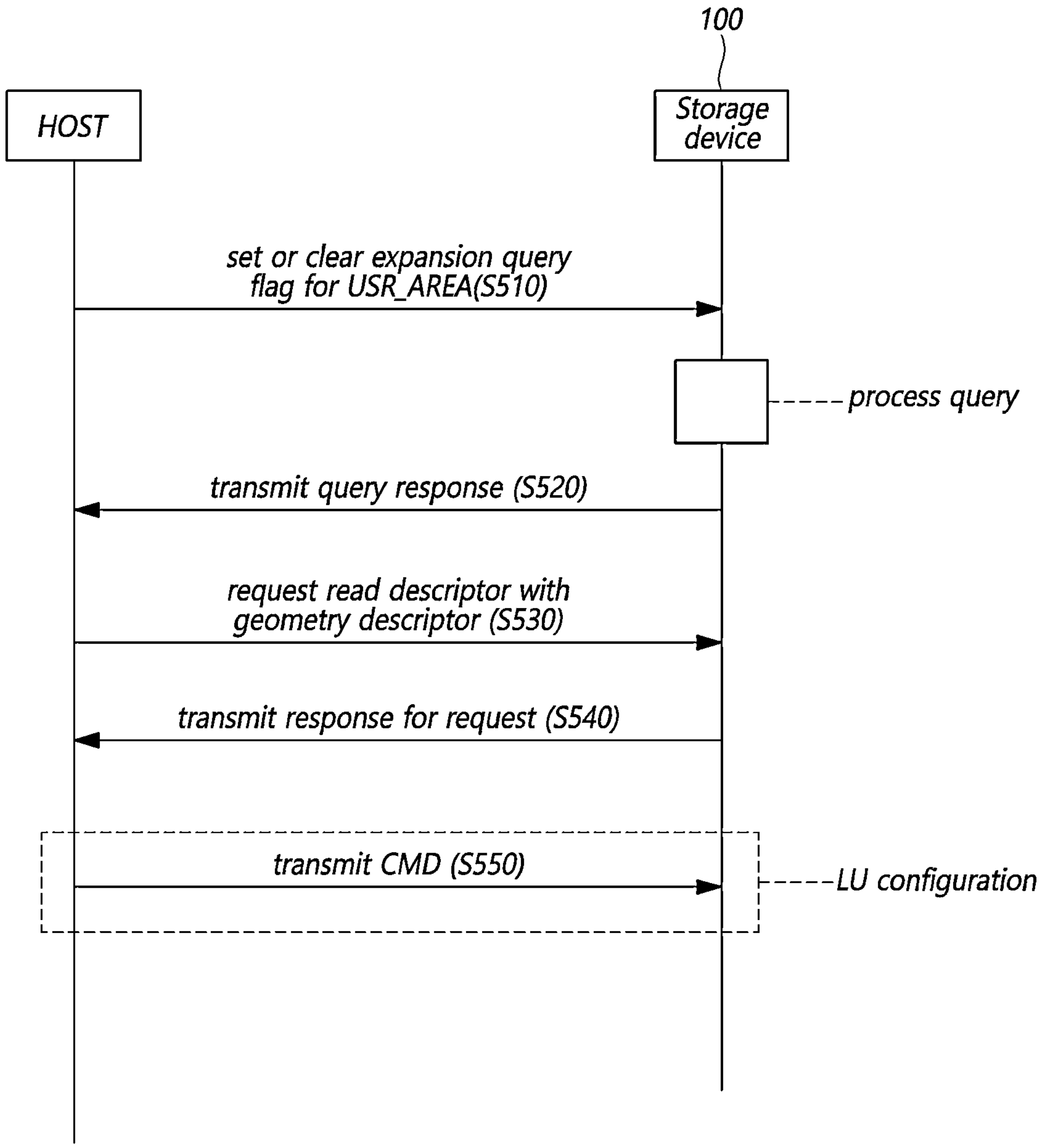
FIG. 5 is a diagram showing an operation in which a storage device transmits information about a maximum size of a user data area to a host according to an embodiment of the present disclosure.

FIG. 5 is a diagram showing an operation in which a storage device transmits information about a maximum size of a user data area to a host HOST according to an embodiment of the present disclosure.

Referring to FIG. 5, before receiving a command CMD from a host HOST, a storage device 100 may transmit information about the maximum size of the user data area USR_AREA to the host HOST.

Specifically, the host HOST may transmit to a controller 120 of the storage device 100 a query that sets or clears a query flag about whether user data area USR_AREA of the storage device 100 is to be expanded (S510). The query may include at least one of a field indicating the function of the query, an operator code OpCode indicating whether to set or clear the query flag, and an identifier (e.g., 0x85) of the query flag.

The field indicating the function of the query may be included in a UFS Protocol Information Unit (UPIU) of the query, and may be set to a value (e.g., 0x81) that indicates an expansion of the user data area USR_AREA.

When the operator code OpCode is a first value (e.g., 0x6), the operator code may indicate that the corresponding request is a request to set the query flag. When the operator code OpCode is a second value (e.g., 0x7), the operator code may indicate that the corresponding request is a request to clear the query flag.

If the query flag is set, the storage device 100 can increase the size of the user data area USR_AREA. When the query flag is cleared, however, the storage device 100 is unable to increase the size of the user data area USR_AREA.

The controller 120 of the storage device 100 may process the above-described query and then transmit a response to the above-described query to the host HOST (S520).

The controller 120 of the storage device 100 may transmit information regarding the maximum size of the user data area USR_AREA in various ways.

For example, the controller 120 may add information about the maximum size of the user data area USR_AREA to the geometry descriptor of a Universal Flash Storage (UFS) and then transmit the information to the host HOST.

To this end, the host HOST may first send a read descriptor request, which is a request for a geometry descriptor, to the controller 120 (S530). When transmitting a geometry descriptor to the host HOST in response to a read descriptor request received from the host HOST, the controller 120 may add information about the maximum size of the user data area USR_AREA (S540) to the response.

The host HOST may receive the information about the maximum size of the user data area USR_AREA and use the information to determine the target size, which is a size in a range below the maximum size.

For example, the host HOST may add the target size to device descriptor header and transmit it before the logical unit (LU) configuration operation of the UFS. The controller 120 may perform an operation to increase the size of the user data area USR_AREA by the target size sent before the logical unit configuration operation.

After the host HOST transmits the command CMD to the storage device 100, the storage device 100 may increase the size of the user data area USR_AREA in response.

For example, the host HOST may transmit the command CMD to the storage device 100 during the logical unit configuration of Universal Flash Storage (UFS) (S550). In order to increase the size of the user data area USR_AREA, the host HOST may add information about the target size to a specific field (e.g. qTotalRawDeviceCapacity) of the command CMD and transmit the information.

An operation has been described above in which the host HOST sends a request the storage device 100 to increase the size of the user data area USR_AREA.

When the size of the user data area USR_AREA increases by the request of the host HOST, the size of the reserved area RSV_AREA decreases.

Therefore, it is highly likely that the number of free memory blocks, among the plurality of memory blocks BLK included in the memory 110, will rapidly decrease. As a result, the storage device 100 may reach a dirty state more quickly, reducing the efficiency of garbage collection.

Therefore, in disclosed embodiments, the controller 120 of the storage device 100 may change one or more garbage collection parameters used to control garbage collection in order to efficiently execute garbage collection when the size of the user data area USR_AREA increases.

The more garbage collection parameters used to control garbage collection may include at least one of a threshold free memory block count that determines whether to execute garbage collection, an execution time of garbage collection and a ratio of garbage collection execution time to the time to execute a write operation by the host.

Figure 6:
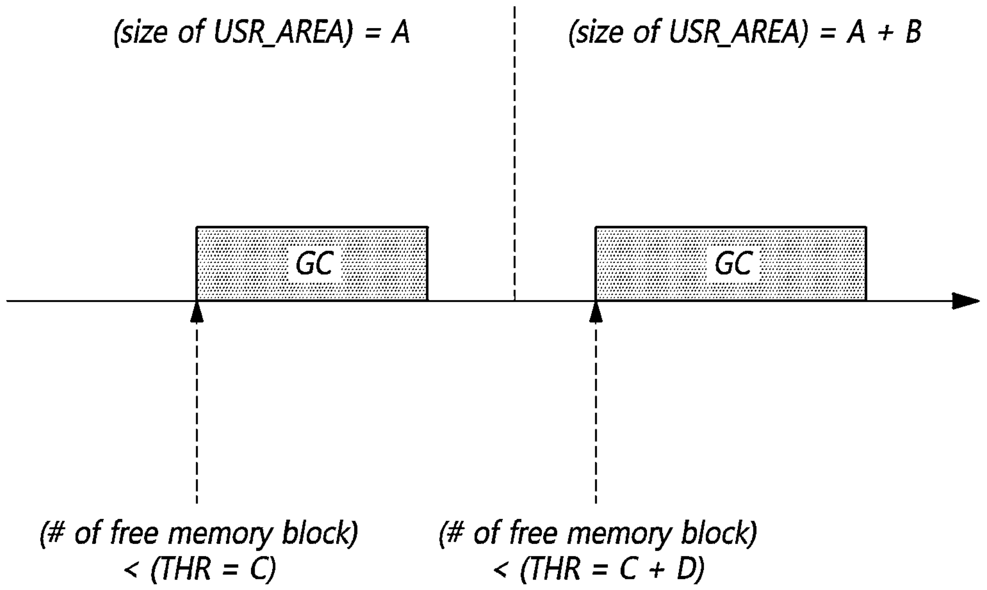
FIG. 6 is a diagram showing an example of an operation in which a storage device changes garbage collection parameters based on a size of a user data area according to an embodiment of the present disclosure.
Figure 7:
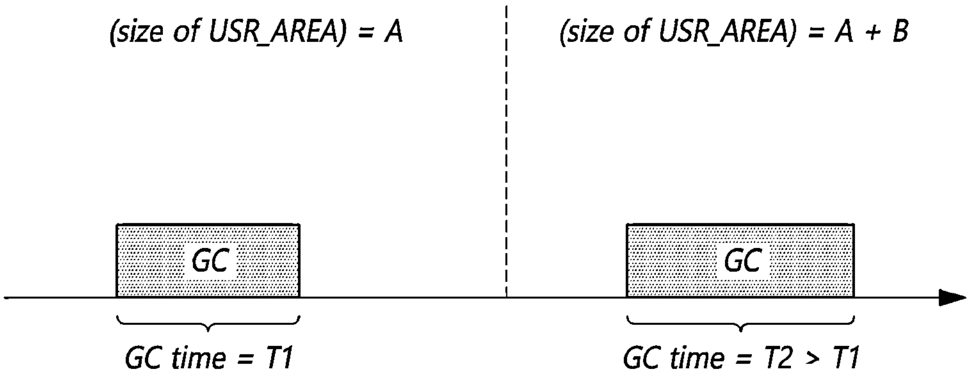
FIG. 7 is a diagram showing an operation in which a storage device changes garbage collection parameters based on a size of a user data area according to an embodiment of the present disclosure.

Referring to FIGS. 6 to 7, the storage device 100 may change garbage collection parameters based on the size of the user data area USR_AREA, as described in detail below.

FIG. 6 is a diagram showing an example of an operation in which a storage device changes garbage collection parameters based on a size of a user data area according to an embodiment of the present disclosure.

In embodiments of the present disclosure, one or more of the above-described garbage collection (GC) parameters may include a threshold free memory block count.

A controller 120 of a storage device 100 may increase the value of the threshold free memory block count when the size of the user data area USR_AREA is increased from a reference size by a target size.

The threshold free memory block count is a value that serves as the basis for the execution of garbage collection. The controller 120 may execute garbage collection when the number of free memory blocks from among the plurality of memory blocks BLK is less than or equal to the threshold free memory block count. Accordingly, when the threshold free memory block count increases, the controller 120 starts garbage collection at an earlier point in time.

For example, the threshold free memory block count may be determined based on the target size for a reference size increase. The threshold free memory block count may be proportional to the target size.

As another example, the threshold free memory block count may be set by a host HOST.

In FIG. 6, the reference size of the user data area USR_AREA is A, and the threshold free memory block count THR is C.

When the size of the user data area USR_AREA increases from the reference size A by a target size B at the request of the host HOST, the controller 120 may increase the threshold free block count (THR) from C to C+D, wherein D is arbitrary number.

By increasing the threshold free block count number, the controller 120 can start garbage collection earlier and mitigate the effect of a decrease in free memory blocks when the size of the user data area USR_AREA increases.

FIG. 7 is a diagram showing an operation in which a storage device changes garbage collection parameters based on a size of a user data area according to an embodiment of the present disclosure.

In embodiments of the present disclosure, one or more of the above-described garbage collection parameters may include the time required to execute garbage collection (execution time).

A controller 120 of a storage device 100 may increase the execution time of garbage collection when the size of a user data area USR_AREA increases from a reference size by a target size.

For example, the execution time of garbage collection may be determined using the target size. The execution time of garbage collection may be proportional to the target size.

As another example, the execution time of garbage collection may be set by the host HOST.

In FIG. 7, the reference size of the user data area USR_AREA is A, and the execution time of garbage collection is T1.

When the size of the user data area USR_AREA increases from the reference size A by a target size B by the request of the host HOST, the controller 120 may increase the execution time of garbage collection from T1 to T2.

By increasing the execution time of garbage collection, the controller 120 can generate more free memory blocks through garbage collection and respond to a decrease in free memory blocks that results from an increase in the size of the user data area USR_AREA.

An operation of the storage device 100 to change garbage collection parameters based on the size of the user data area USR_AREA has been described above.

Hereinafter, an operation of the storage device 100 to change garbage collection parameters based on a decrease in the number of free memory blocks during a predetermined time period will be described.

Depending on conditions such as the type of data used by the host HOST and whether or not a write booster function is used, the use ratio of SLC blocks and TLC blocks among the plurality of memory blocks BLK and the use ratio of metadata blocks may vary. The storage device 100 may use such conditions to recognize the rate of reduction of free memory blocks and change garbage collection parameters accordingly.

Figure 8:
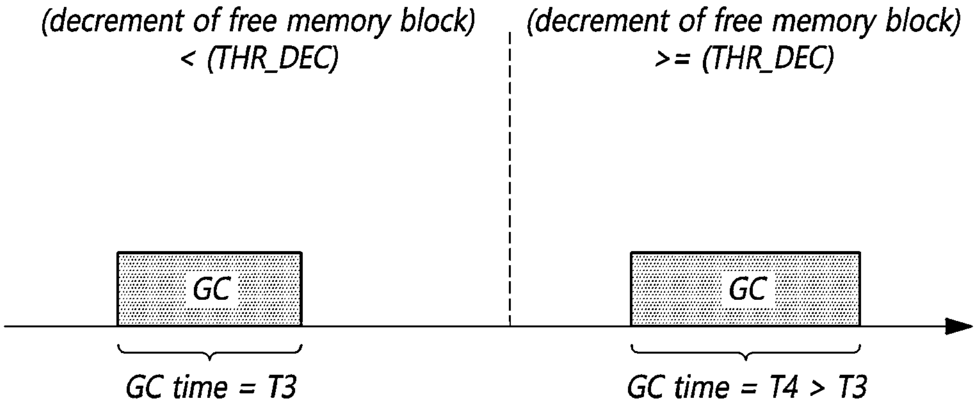
FIG. 8 is a diagram showing an operation in which a storage device changes garbage collection parameters based on an amount of reduction in free memory blocks according to an embodiment of the present disclosure.

FIG. 8 is a diagram showing an operation in which a storage device changes garbage collection parameters based on an amount of reduction in free memory blocks according to an embodiment of the present disclosure.

In embodiments of the present disclosure, one or more of the above-described garbage collection parameters may include the duration of or amount of time to execute garbage collection (execution time).

A controller 120 of a storage device 100 may increase the execution time of garbage collection when a decrease in the number of free memory blocks during a predetermined time period is greater than or equal to a threshold decrease amount THR_DEC.

The predetermined time period may be determined in various ways. For example, the predetermined time period may be determined as the time period it takes for the host HOST to write data of a certain size (e.g., 1 GB) to the storage device 100.

In FIG. 8, when a decrease in the number of free memory blocks over a predetermined time period is less than a threshold decrease amount THR_DEC, the controller 120 may set the execution time of garbage collection to T3.

When the decrease in the number of free memory blocks during a predetermined time period is greater than the threshold decrease amount THR_DEC, the controller 120 may set the execution time of garbage collection to T4, which is greater than T3.

That is, when the rate at which free memory blocks decrease increases, the storage device 100 may increase the execution time of garbage collection, which results in more free memory blocks.

Figure 9:
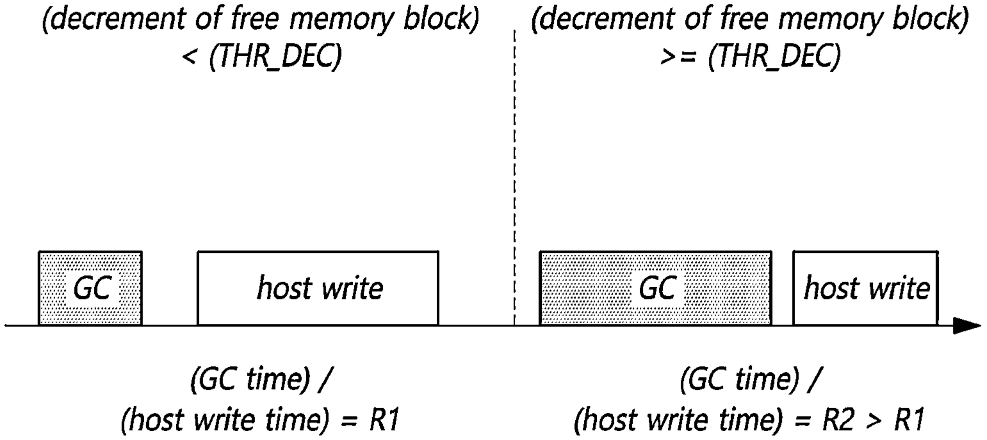
FIG. 9 is a diagram showing an operation in which a storage device changes garbage collection parameters based on an amount of reduction in free memory blocks according to an embodiment of the present disclosure.

FIG. 9 is a diagram showing an operation in which a storage device changes garbage collection parameters based on an amount of reduction in free memory blocks according to an embodiment of the present disclosure.

In embodiments of the present disclosure, one of the garbage collection parameters described above may be a ratio of garbage collection execution time to execution time of a write operation by the host HOST.

A controller 120 of a storage device 100 may increase the ratio of garbage collection execution time to write execution time when a decrease in the number of free memory blocks during a predetermined time period is greater than a threshold decrease amount THR_DEC.

In FIG. 9, when the decrease in the number of free memory blocks during a predetermined time period is less than a threshold decrease count THR_DEC, the controller 120 may set the ratio of garbage collection execution time to write execution time by the host HOST to R1.

When a decrease in the number of free memory blocks during a predetermined time period is greater than or equal to the threshold decrease count THR_DEC, the controller 120 may set the ratio of garbage collection execution time to write execution time by the host HOST to R2, which is greater than R1. To this end, the controller 120 may reduce the execution time of a write operation by the host HOST and increase the execution time of garbage collection.

That is, when the rate at which free memory blocks decrease rapidly increases, the storage device 100 may increase the execution time of garbage collection, which increases the number of free memory blocks compared to the execution time of a host write operation, which reduces the number of free memory blocks.

An operation of a storage device 100 that changes garbage collection parameters to increase the number of free memory blocks has been described above.

The storage device 100 may perform additional operations other than changing garbage collection parameters to further increase the number of free memory blocks.

Hereinafter, an operation in which a storage device 100 deletes temporary data stored in the user data area USR_AREA, which increases the number of free memory blocks, will be described.

Figure 10:
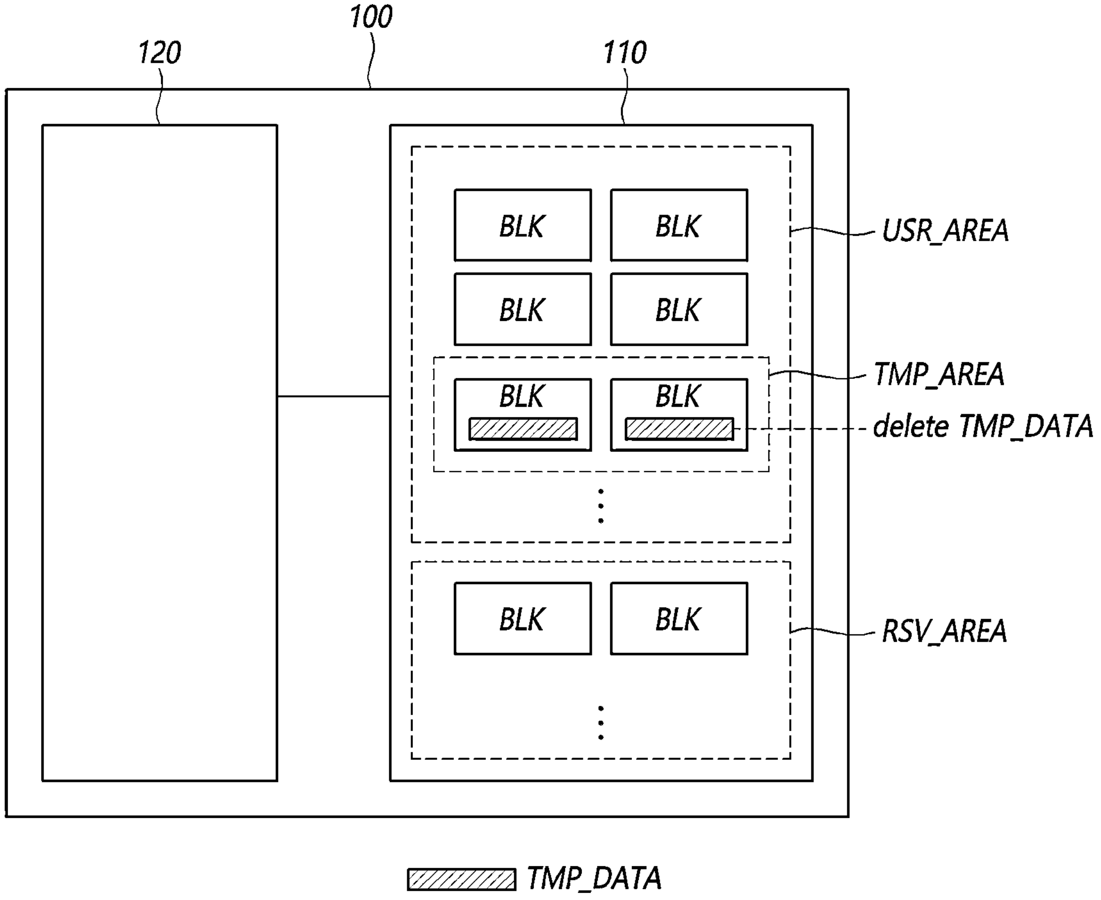
FIG. 10 is a diagram showing an operation in which a storage device deletes data stored in a temporary data area according to an embodiment of the present disclosure.

FIG. 10 is a diagram showing an operation in which a storage device deletes data stored in a temporary data area according to an embodiment of the present disclosure.

Referring to FIG. 10, when the number of free memory blocks among the plurality of memory blocks BLK is less than a threshold free memory block count, a controller 120 of a storage device 100 may delete all or part of temporary data TMP_DATA stored in the user data area USR_AREA. Temporary data TMP_DATA may be stored in a temporary data area TMP_AREA set within the user data area USR_AREA. The size of the user data area USR_AREA may have increased from a reference size by a target size.

When the number of free memory blocks is less than the threshold free memory block count, such as for example in an urgent state, the controller 120 may delete all or part of the temporary data TMP_DATA and perform an erase operation on memory blocks in which the temporary data TMP_DATA was stored and convert the memory blocks to free memory blocks, thus increasing the number of free memory blocks.

The temporary data TMP_DATA is data temporarily created by the host HOST, and the host HOST can set whether user data stored in the user data area USR_AREA is temporary data.

The host HOST may transmit information, to the controller 120, about the size of the temporary data area TMP_AREA and the temporary data (e.g., logical unit information or logical address range information for the temporary data) to be stored in the temporary data area TMP_AREA.

Figure 11:
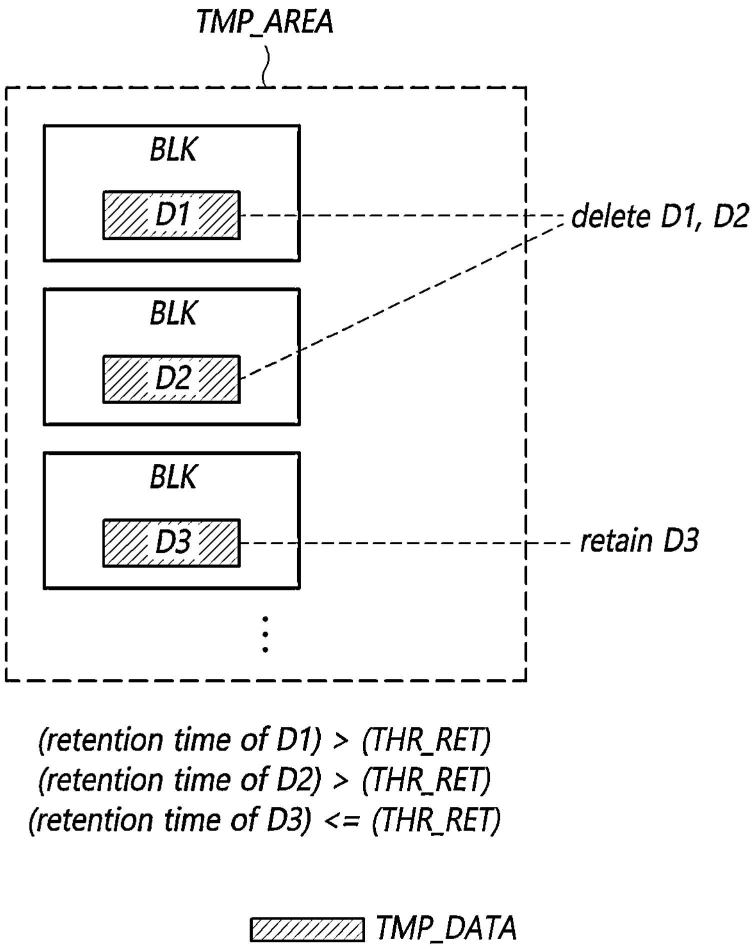
FIG. 11 is a diagram showing an operation in which a storage device determines which data will be deleted from a temporary data area according to an embodiment of the present disclosure.

FIG. 11 is a diagram showing an operation in which a storage device determines which data will be deleted from a temporary data area according to an embodiment of the present disclosure.

In embodiments of the present disclosure, a controller 120 of a storage device 100 may delete a portion of temporary data TMP_DATA whose retention time is greater than a threshold retention time THR_RET.

The retention time of the temporary data TMP_DATA refers to the time period during which the temporary data TMP_DATA, after being written to the memory 110, remains stored in the memory 110 and is not deleted.

The host HOST may transmit information about the threshold retention time THR_RET to the controller 120.

In FIG. 11, retention times of D1 and D2 for some of the temporary data TMP_DATA are greater than a threshold retention time THR_RET, and a retention time of D3 for some of the temporary data TMP_DATA is less than the threshold retention time THR_RET.

Therefore, the controller 120 may delete temporary data TMP_DATA corresponding to retentions times D1 and D2 and retain temporary data TMP_DATA corresponding to retention time D3 in the temporary data area TMP_AREA.

The controller 120 may store information about the retention time of the temporary data TMP_DATA in a metadata area (not shown). The metadata area (not shown) is an area that stores metadata corresponding to the user data stored in the user data area USR_AREA.

For example, information about the retention time of temporary data TMP_DATA may include information on the time from which a part of the temporary data TMP_DATA was first stored in the memory block in a temporary data area TMP_AREA and information on the time at which the part of the temporary data TMP_DATA was last stored in the memory block. The controller 120 may periodically store information about the retention time of temporary data TMP_DATA in the metadata area (not shown).

The storage device 100 may delete a large file stored in the user data area USR_AREA to increase the number of free memory blocks.

Figure 12:
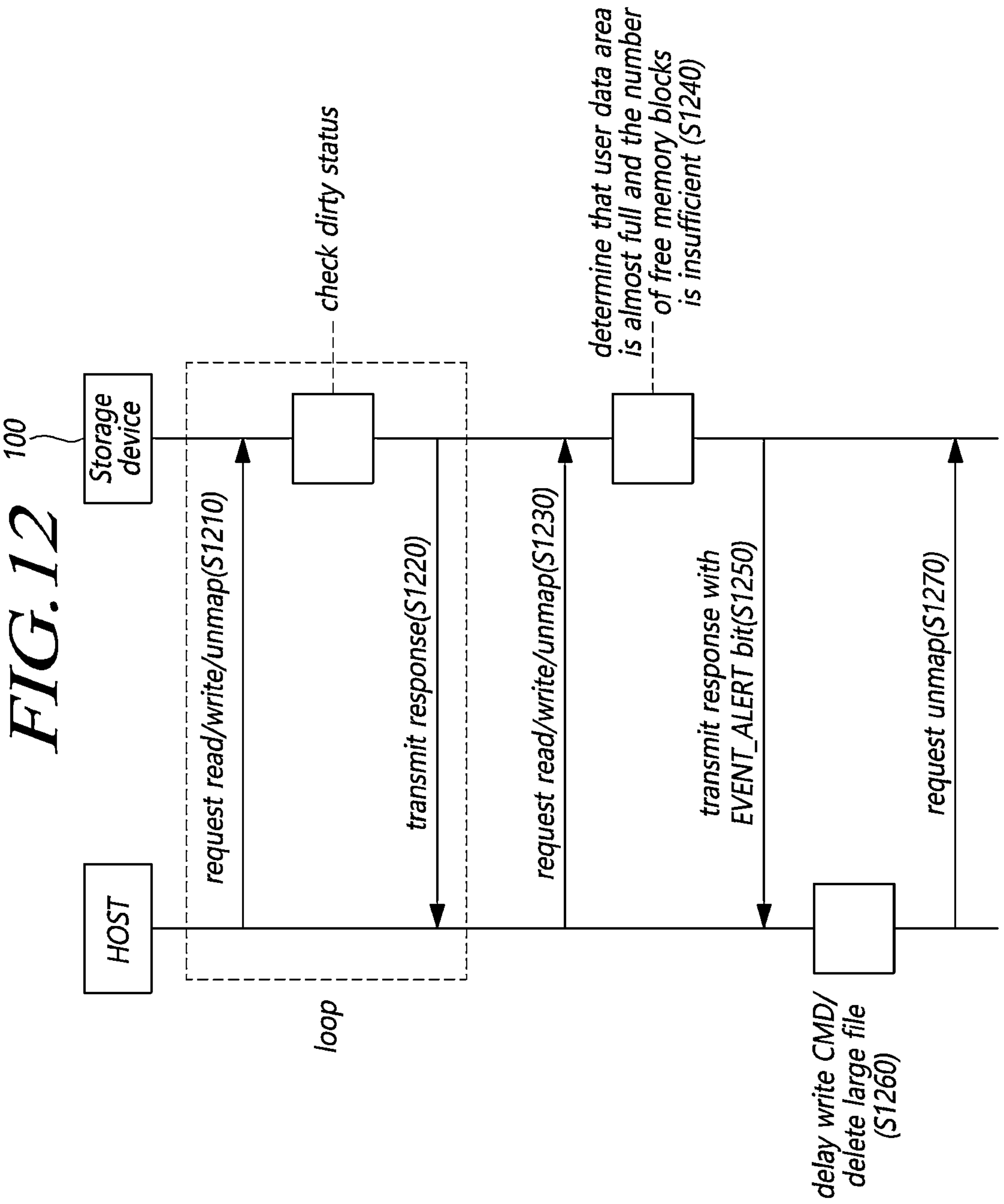
FIG. 12 is a diagram showing an operation in which a storage device deletes a large file according to an embodiment of the present disclosure.

FIG. 12 is a diagram showing an operation in which a storage device deletes a large file according to an embodiment of the present disclosure.

Referring to FIG. 12, a host HOST may transmit a read command, write command, or un-map command to a storage device 100 (S1210). A controller 120 of the storage device 100 may process a read command, write command, or un-map command transmitted by the host HOST, check whether the storage device 100 has entered a dirty state, and send a response to the host HOST (S1220). The operations S1210 and S1220 described above may be executed repeatedly.

The controller 120 may receive a read command, write command or un-map command from the host HOST (S1230). While processing the received command, the controller 120 may determine that the storage device 100 has entered a dirty state, a user data area USR_AREA is almost full, and the number of free memory blocks is less than a threshold free memory block count (S1240).

In this case, the controller 120 may set an event notification EVENT_ALERT bit information in response to the read command, write command, or un-map command transmitted by the host HOST, and notify the host HOST that the storage device 100 is in a dirty a state (S1250). For example, wExceptionEventControl bit value of the event notification EVENT_ALERT bit information may be set to a first value (e.g., bit 11) and a wExceptionEventStatus bit value may be set to a second value (e.g., bit 11).

In order to generate free memory blocks when the host HOST receives a response with the event notification EVENT_ALERT bit set, the host HOST may delay transmitting a write command to the storage device 100 or delete a large file stored in the storage device 100 (S1260). For example, the large file may be a file whose size is greater than or equal to a threshold size.

The host HOST may transmit, to the storage device 100, an un-map request for the area where a deleted large file was stored (S1270).

When the controller 120 determines that the storage device 100 has entered a dirty state while processing a read command, write command or un-map command transmitted by the host HOST, the controller 120 may delay, regardless of the request of the host HOST, a data write operation requested by the host HOST, or may directly delete a large file stored in the user data area USR_AREA of the storage device 100.

Figure 13:
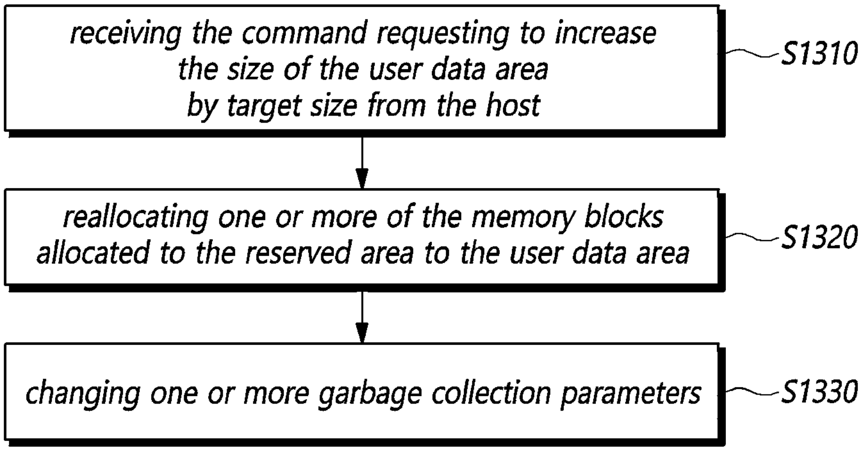
FIG. 13 is a flowchart showing a method of operating a storage device according to an embodiment of the present disclosure.

FIG. 13 is a flowchart showing a method of operating a storage device according to an embodiment of the present disclosure.

Referring to FIG. 13, a method of operating a storage device 100 may include receiving a command CMD from the host HOST requesting an increase to the size of user data area USR_AREA by a target size (S1310). The user data area USR_AREA is configured in a memory 110 that includes a plurality of memory blocks BLK.

The method of operating the storage device 100 may further include transmitting to the host HOST, before receiving the command CMD from the host HOST, information about the maximum size of the user data area USR_AREA.

For example, the storage device 100 may transmit information about the maximum size of the user data area USR_AREA to the host HOST in response to a read descriptor request from the host HOST. The read descriptor request may be a request for a geometry descriptor.

The method of operating the storage device 100 may include reallocating, in response to the command CMD, one or more of the memory blocks allocated to a reserved area RSV_AREA to the user data area USR_AREA (S1320).

The method of operating the storage device 100 may include selectively changing one or more garbage collection parameters (S1330).

Garbage collection parameters may include at least one of a threshold free memory block count that is used to determine whether to execute garbage collection, an execution time of garbage collection, and a ratio of garbage collection execution time to a time to execute a write operation by the host HOST.

For example, the operation S1330 may increase the threshold free memory block count when the size of the user data area USR_AREA increases from a reference size by the target size.

In another example, the operation S1330 may increase the execution time of garbage collection when the size of the user data area USR_AREA increases from the reference size by the target size.

In a further example, the operation S1330 may increase the execution time of garbage collection when the decrease in the number of free memory blocks, from among the plurality of memory blocks BLK, during a predetermined time period is greater than the threshold decrease amount THR_DEC.

In yet another example, the operation S1330 may increase the ratio of garbage collection execution time to write execution time by the host HOST when the decrease in the number of free memory blocks among the plurality of memory blocks BLK during a predetermined time period is greater than the threshold decrease amount THR_DEC.

The method of operating the storage device 100 may further include deleting all or part of temporary data TMP_DATA stored in the user data area USR_AREA when the number of free memory blocks among the plurality of memory blocks BLK is less than or equal to a threshold free memory block count.

Deleting all or part of the temporary data TMP_DATA may delete a portion of the temporary data TMP_DATA whose retention time is greater than a threshold retention time.

The method of operating the storage device 100 may further include notifying the host HOST that, when the number of free memory blocks among the plurality of memory blocks BLK is less than or equal to the threshold free memory block count, the number of free memory blocks among the plurality of memory blocks BLK is less than or equal to a threshold free memory block count by setting an event notification EVENT_ALERT bit in response to a read command, a write command or an un-map command transmitted by the host HOST.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
- a memory including a plurality of memory blocks; and
- a controller configured to:
  - allocate at least one of the plurality of memory blocks to a user data area that stores user data,
  - allocate at least one of the remaining memory blocks, among the plurality of memory blocks that are not allocated to the user data area, to a reserved area,
  - receive a command from a host requesting an increase in a size of the user data area by a target size, and
  - reallocate to the user data area, in response to the command, one or more of the memory blocks allocated to the reserved area,
- wherein the controller is configured to change one or more garbage collection parameters,
- wherein the garbage collection parameters include at least one of a threshold free memory block count that determines whether to execute garbage collection, an execution time of garbage collection and a ratio of garbage collection execution time to write execution time by the host, and
- wherein the controller is configured to increase the threshold free memory block count when the size of the user data area increases from a reference size by the target size, and
- execute garbage collection when a number of free memory blocks among the plurality of memory blocks is less than or equal to the threshold free memory block count.

2. The storage device according to claim 1,
wherein the controller is configured to transmit to the host, before receiving the command from the host, information about the maximum size of the user data area.

3. The storage device according to claim 2,
wherein the controller is configured to transmit the information about the maximum size of the user data area to the host in response to a read descriptor request from the host, and
wherein the read descriptor request is a request for a geometry descriptor.

4. The storage device according to claim 1,
wherein the controller is configured to execute an operation of increasing the size of the user data area before a logical unit configuration operation.

5. The storage device according to claim 1,
wherein the controller is configured to delete all or part of temporary data stored in the user data area when a number of free memory blocks among the plurality of memory blocks is less than or equal to a threshold free memory block count.

6. The storage device according to claim 5,
wherein the controller is configured to delete a portion of the temporary data whose retention time is greater than a threshold retention time.

7. The storage device according to claim 6,
wherein the controller is configured to store information about the retention time of the temporary data in a metadata area that stores metadata corresponding to the user data stored in the user data area.

8. The storage device according to claim 5,
wherein the controller is configured to delay a data write operation requested by the host or delete a large file stored in the user data area.

9. The storage device according to claim 1,
wherein the controller is configured to notify the host that a number of free memory blocks among the plurality of memory blocks is less than or equal to a threshold free memory block count by setting an event notification bit in response to a read command, a write command or an un-map command transmitted by the host.

10. An operating method of a storage device comprising:
receiving a command from a host requesting an increase to a size of a user data area, which is included in a plurality of memory blocks, by a target size;

in response to the command, reallocating one or more of the memory blocks allocated to a reserved area to the user data area; and changing one or more garbage collection parameters;

wherein the one or more garbage collection parameters include at least one of a threshold free memory block count that determines whether to execute garbage collection, an execution time of garbage collection, and a ratio of garbage collection execution time to write execution time by the host, and wherein the changing the one or more garbage collection parameters increases the threshold free memory block count when the size of the user data area increases from a reference size by the target size.

11. The operating method according to claim 10, further comprising:

transmitting, before receiving the command from the host, information about the maximum size of the user data area to the host.

12. The operating method according to claim 11, wherein the storage device transmits the information about the maximum size of the user data area to the host in response to a read descriptor request from the host, and wherein the read descriptor request is a request for a geometry descriptor.

13. The operating method according to claim 10, further comprising:

deleting all or part of temporary data stored in the user data area when a number of free memory blocks among the plurality of memory blocks is less than or equal to a threshold free memory block count.

14. The operating method according to claim 13, wherein the deleting all or part of the temporary data deletes a portion of the temporary data whose retention time is greater than a threshold retention time.

15. The operating method according to claim 10, further comprising:

notifying the host that a number of free memory blocks among the plurality of memory blocks is less than or equal to a threshold free memory block count by setting an event notification bit in response to a read command, a write command or an un-map command transmitted by the host.

* * * * *